United States Patent
Kato

(10) Patent No.: US 9,383,245 B2
(45) Date of Patent: Jul. 5, 2016

(54) LIQUID LEVEL MEASURING DEVICE

(71) Applicant: AISAN KOGYO KABUSHIKI KAISHA, Aichi-ken (JP)

(72) Inventor: Nobuhiro Kato, Aichi-ken (JP)

(73) Assignee: AISAN KOGYO KABUSHIKI KAISHA, Aichi-Ken (JP)

(*) Notice: Subject to any disclaimer, the term of this patent is extended or adjusted under 35 U.S.C. 154(b) by 207 days.

(21) Appl. No.: 14/181,693

(22) Filed: Feb. 16, 2014

(65) Prior Publication Data
US 2014/0230544 A1 Aug. 21, 2014

(30) Foreign Application Priority Data
Feb. 19, 2013 (JP) ................ 2013-029986

(51) Int. Cl.
*G01F 23/26* (2006.01)
*G01F 23/24* (2006.01)
*B60K 15/03* (2006.01)

(52) U.S. Cl.
CPC .......... *G01F 23/268* (2013.01); *B60K 15/03* (2013.01); *G01F 23/263* (2013.01); *B60K 2015/03111* (2013.01); *B60K 2015/03217* (2013.01); *G01F 23/24* (2013.01); *G01F 23/241* (2013.01); *G01F 23/242* (2013.01)

(58) Field of Classification Search
CPC ............... G01F 23/268; B60K 2015/03217
See application file for complete search history.

(56) References Cited

U.S. PATENT DOCUMENTS 3,342,138 A * 9/1967 Parks .............. E03F 5/22
 137/392
3,821,107 A * 6/1974 Peoples .............. C02F 1/048
 210/150

FOREIGN PATENT DOCUMENTS

| JP | H2-87022 | 3/1990 |
| JP | H5-223624 | 8/1993 |
| JP | 2005-351688 | 12/2005 |
| JP | 2006-38497 | 2/2006 |

* cited by examiner

*Primary Examiner* — Paul West
(74) *Attorney, Agent, or Firm* — Vierra Magen Marcus LLP

(57) ABSTRACT

A liquid level measuring device for measuring a liquid level of liquid stored in a container may comprise a discharging unit, a first storing space, and an electrode unit. The discharging unit may be configured to discharge the liquid compressed by a pump. The pump may be configured to suck the liquid stored in the container and feed the liquid toward a liquid usage device by pressure. The first storing space may be located in the container and configured to accept the liquid discharged from the discharging unit. The electrode unit may be disposed in the first storing space and comprising a first pair of electrodes configured to measure the liquid level of the liquid within the first storing space. The electrode unit may compose at least a part of a wall surface defining the first storing space.

11 Claims, 15 Drawing Sheets

LIQUID LEVEL MEASURING DEVICE

CROSS-REFERENCE TO RELATED APPLICATION

This application claims priority to Japanese Patent Application No. 2013-29986 filed on Feb. 19, 2013, the contents of which are hereby incorporated by reference into the present application.

TECHNICAL HELD

The present application discloses a liquid level measuring device for measuring a liquid level of liquid stored in a container.

DESCRIPTION OF RELATED ART

Japanese Patent Application Publication No. 115-223624 discloses a liquid surface level detecting device for detecting a liquid surface level in a fuel tank. The liquid surface level detecting device comprises a measuring electrode and an earth electrode. Among the measuring electrode and the earth electrode, portions below the liquid level are immersed in fuel and portions above the actual liquid level are exposed from the fuel. Therefore, capacitances of the measuring electrode and the earth electrode vary depending on the liquid surface level. The liquid surface level detecting device detects the liquid surface level by detecting the capacitances of the measuring electrode and the earth electrode.

SUMMARY

A capacitance of a pair of electrodes in a container varies depending on a liquid level in the container as well as on conductivity of liquid. For example, when the liquid inside the container is mixed liquid containing two or more types of liquid, since each of the liquid is inhomogeneously distributed, the conductivity of the liquid at a portion Where the pair of electrodes is immersed in the liquid is also inhomogeneously distributed. In this state, due to the inhomogeneity of the conductivity of the liquid, a measurement error of a liquid level occurs.

The present description discloses a technique for preventing conductivity of liquid around a pair of electrodes for measuring a liquid level from being inhomogeneously distributed.

The present application discloses a liquid level measuring device for measuring a liquid level of liquid stored in a container. The liquid level measuring device may comprise a discharging unit, a first storing space and an electrode unit. The discharging unit may be configured to discharge the liquid compressed by a pump. The pump may be configured to suck the liquid stored in the container and feed the liquid toward a liquid usage device by pressure. The first storing space may be located in the container and configured to accept the liquid discharged from the discharging unit. The electrode unit may be disposed in the first storing space and comprise a first pair of electrodes configured to measure the liquid level of the liquid within the first storing space. The electrode unit may compose at least a part of a wall surface defining the first storing space.

In the liquid level measuring device described above, the liquid agitated by the pump and discharged from the discharging unit is accepted by the first storing space. Therefore, the liquid within the first storing space is homogenized by the pump. Accordingly, the conductivity of the liquid around the first pair of electrodes may be prevented from being inhomogeneously distributed. A capacitance of the first pair of electrodes may be prevented from varying due to the presence of liquid with inhomogeneous conductivity around the first pair of electrodes. As a result, a liquid level may be appropriately measured using the capacitance of the first pair of electrodes.

DETAILED DESCRIPTION

Figure 1:
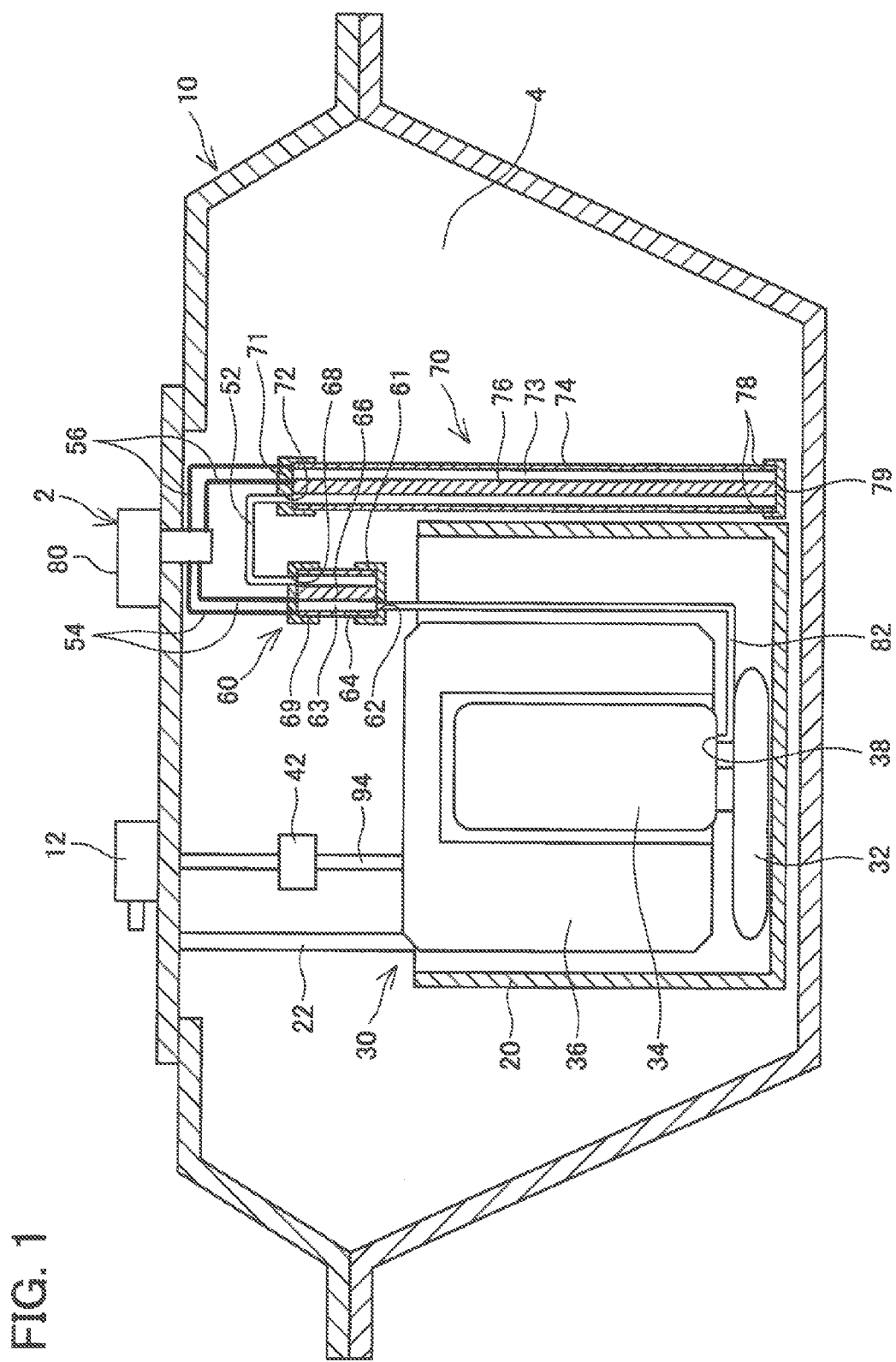
FIG. 1 shows a configuration of a periphery of a fuel pump of a first embodiment.

Main features of the embodiments described below will now be listed. It is to be understood that the following technical elements respectively constitute independent technical elements which exhibit technical usefulness either solely or in various combinations thereof, and shall not be limited to the combinations described in the claims at the time of filing.

(feature 1) The liquid level measuring device may comprise a second storing space located in the container and configured to accept the liquid discharged from the discharging unit, and a second pair of electrodes disposed in the second storing space and configured to measure conductivity of liquid within the second storing space. The second storing space may be disposed between the discharging unit and the first storing space and communicates with the first storing space. According to this configuration, conductivity of liquid flowing into the first storing space may be measured using the second pair of electrodes. In addition, when measuring a liquid level of the liquid in the container using the first pair of electrodes, the first storing space and inside of the container should be communicated with each other in order to cause the liquid level within the first storing space to vary in accordance with the liquid level in the container. On the other hand, in order to measure the conductivity of the liquid in the container using the second pair of electrodes, the liquid level within the second storing space must be prevented from varying. When communicating the discharging unit, the first storing space, and the second storing space with one another, a configuration in which the second storing space is disposed between the discharging unit and the first storing space enables greater freedom in disposing the second storing space with respect to the first storing space as compared to a configuration in which the first storing space is disposed between the discharging unit and the second storing space.

(feature 2) In the liquid level measuring device, one electrode of the first pair of electrodes and one electrode of the second pair of electrodes may be one common electrode. According to this configuration, the number of electrodes may be reduced and the liquid level measuring device may be downsized.

(feature 3) In the liquid level measuring device, the electrode unit may comprise a substrate on which the first pair of the electrodes and the second pair of the electrodes are disposed. According to this configuration, the liquid level measuring device may be downsized as compared to a configuration in which separate substrates are provided for the first pair of electrodes and the second pair of electrodes.

(feature 4) In the liquid level measuring device, the second storing space may be located within the first storing space. In this configuration, the inside of the first storing space exists around the second storing space. According to this configuration, when measuring the conductivity of liquid using the second pair of electrodes, the capacitance of the second pair of electrodes may be prevented from varying due to outside environment.

(feature 5) In the liquid level measuring device, the first pair of electrodes may comprise a first electrode having a cylindrical shape, and a second electrode having a cylindrical shape and disposed inside of the first electrode. The second storing space may be defined by an inner surface of the second electrode. According to this configuration, the second storing space may be readily disposed within the first storing space.

(feature 6) The liquid level measuring device may comprise a temperature detecting unit stored in the second storing space and configured to detect a temperature of the liquid within the second storing space. A conductivity of liquid may vary according to the temperature of the liquid. For example, when the conductivity of a liquid varies according to the temperature of the liquid and a concentration of a particular substance in the liquid, the concentration of the particular substance may be detected by detecting the temperature.

(feature 7) The liquid level measuring device may comprise a wall disposed on a lower side of the electrode unit and comprising a wall portion composing a part of the wall surface defining the first storing space. The wall portion may comprise a communicating opening communicating inside and outside of the first storing space. According to this configuration, the liquid level may be prevented from being differentiated between the inside and the outside of the first storing space.

(feature 8) In the liquid level measuring device, the electrode unit may comprise a communication opening communicating inside and outside of the first storing space. The communication opening may be disposed at a part of the electrode unit composing the part of the wall surface defining the first storing space. According to this configuration, the liquid level may be prevented from being differentiated between the inside and the outside of the first storing space.

(feature 9) The liquid level measuring device may comprise a check valve disposed outside of the first storing space. The check valve may be configured to allow the liquid to flow from the inside to the outside of the first storing space through the communication opening and restrain the liquid to flow from the outside to the inside of the first storing space through the communication opening. According to this configuration, a liquid other than the liquid discharged from the discharging unit may be prevented from entering the first storing space through the communication opening.

(feature 10) The liquid level measuring device may comprise a filter configured to remove a foreign substance from the liquid flowing from the outside to the inside of the first storing space. According to this configuration, when liquid flows from the outside to the inside of the first storing space via the communication opening, a foreign substance in the liquid may be prevented from entering the first storing space.

(feature 11) The liquid level measuring device may comprise a storing case disposed outside of the first storing space and defining a third storing space storing the liquid flown from the inside to the outside of the first storing space. The storing case may comprise an opening portion communicating inside of the third storing space and inside of the container. When the pump is driven, the third storing space may be filled with the liquid discharged from the first storing space. On the other hand, when liquid is supplied to the container, the liquid level in the container may rise above the liquid level in the first storing space and the liquid in the container flows toward the first storing space. The liquid flowing from inside the container toward the first storing space may flow into the third storing space. The liquid that fills the third storing space may be pushed by the liquid flowing from inside the container toward the first storing space and enters the first storing space. In other words, the liquid flowing from inside the container toward the first storing space may be prevented from directly entering the first storing space. As a result, liquid in the container not agitated by the pump may be prevented from entering the first storing space.

(feature 12) In the liquid level, measuring device, a cross-sectional shape of the opening portion may be a narrow shape. According to this configuration, a foreign substance may be prevented from entering the third storing space.

(feature 13) In the liquid level measuring device, the opening portion may open toward a bottom of the container. According to this configuration, liquid may be prevented from entering the third storing space from inside the container.

(feature 14) In the liquid level measuring device, the storing case comprises an embankment reducing a flow passage area in which the liquid flows within the third storing space. According to this configuration, a foreign substance may be prevented from entering the third storing space.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved liquid level measuring devices, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

(First Embodiment)

A liquid level measuring device 2 according to the present embodiment is placed on an automobile or the like. The liquid level measuring device 2 is disposed inside a fuel tank 10. FIG. 1 shows a configuration of a periphery of the fuel tank 10 according to the first embodiment. A fuel pump 30 is housed in the fuel tank 10. The fuel pump 30 sucks fuel filtered by a low pressure filter 32 into a pump main body 34, filters the sucked fuel with a high pressure filter 36, and feeds the filtered pressurized fuel to a pipe 94. A pressure regulator 42 is connected to the pipe 94. When pressure of the fuel inside the pressure regulator 42 equals or exceeds a prescribed pressure, the pressure regulator 42 discharges excess fuel in the pipe 94 to the fuel tank 10. Accordingly, the pressure of the fuel inside the pipe 94 is regulated to a constant pressure. The fuel inside the fuel tank 10 is regulated by the fuel pump 30 and the pressure regulator 42 to a certain pressure and is fed by pressure to an engine (not illustrated) from a discharge port 12.

The fuel pump 30 comprises a vapor jet 38. The vapor jet 38 communicates a fuel flow passage in the fuel pump 30 and the fuel tank 10 outside of the fuel pump 30 with each other. The vapor jet 38 is a communication channel for discharging bubbles in the fuel in the fuel pump 30 to the outside of the fuel pump 30. Fuel compressed by the fuel pump 30 is discharged from the vapor jet 38.

The fuel pump 30 is disposed in a reserve cup 20. The reserve cup 20 is fixed to a set plate by a support 22. A jet pump (not illustrated) is disposed at a bottom of the reserve cup 20. The jet pump feeds fuel outside of the reserve cup 20 into the reserve cup 20 using a flow rate of the fuel that is fed by pressure by the fuel pump 30 and discharged from the pressure regulator 42. For example, a Venturi structure is provided, wherein the fuel outside of the reserve cup 20 is sucked by the jet pump when fuel discharged from the pressure regulator 42 passes the Venturi, and the fuel sucked from the outside of the reserve cup 20 is fed into the reserve cup 20 together with the fuel discharged from the pressure regulator 42. By providing the reserve cup 20 and the jet pump, a liquid level around the fuel pump 30 can be kept high even when only a small amount of fuel remains in the fuel tank 10.

The liquid level measuring device 2 comprises a control device 80, a conductivity measuring unit 60, a liquid level measuring unit 70, and a discharge pipe 82. One end of the discharge pipe 82 is connected to the vapor jet 38 and another end of the discharge pipe 82 is connected to the conductivity measuring unit 60. Fuel discharged from the vapor jet 38 passes through the discharge pipe 82 and reaches the conductivity measuring unit 60.

The conductivity measuring unit 60 is disposed above the reserve cup 20. An upper end of the conductivity measuring unit 60 is positioned in a vicinity of an upper end of the fuel tank 10. The conductivity measuring unit 60 comprises a pair of electrodes 64 and 66, an upper wall 69, and a lower wall 61. The electrode 64 has a cylindrical shape. The electrode 64 is grounded via a conducting wire 54. A lower end of the electrode 64 is closed by the lower wall 61. An upper end of the electrode 64 is closed by the upper wall 69. In the conductivity measuring unit 60, a storing space 63 is defined by the electrode 64, the upper wall 69, and the lower wall 61. An inner surface of the electrode 64 constitutes a part of a wall surface that defines the storing space 63. The electrode 66 is housed in the storing space 63. The electrode 66 has a columnar shape. The electrode 64 and the electrode 66 oppose each other across a gap. The electrode 66 is connected to an external power supply via the conducting wire 54 and the control device 80.

The lower wall 61 includes a communication opening 62 that communicates the discharge pipe 82 and the storing space 63 with each other. The fuel discharged from the vapor jet 38 passes through the discharge pipe 82 and the communication opening 62 and is accepted by the storing space 63. The fuel is stored in the storing space 63 until reaching the upper wall 69. According to this configuration, the storing space 63 can be filled with fuel. The upper wall 69 comprises a communication opening 68 that communicates the storing space 63 and a connecting pipe 52 with each other. When fuel is accepted by the storing space 63 from the vapor jet 38 in a state where the storing space 63 is filled with fuel, the fuel within the storing space 63 flows out into the connecting pipe 52 via the communication opening 68.

One end of the connecting pipe 52 is connected to the conductivity measuring unit 60 and another end of the connecting pipe 52 is connected to the liquid level measuring unit 70. Fuel discharged from the storing space 63 passes through the connecting pipe 52 and reaches the liquid level measuring unit 70.

The liquid level measuring unit 70 comprises a pair of electrodes 74 and 76, an upper wall 71, and a lower wall 79. The electrode 74 has a cylindrical shape. The electrode 74 is grounded via a conducting wire 56. The electrode 74 extends in a depth direction of the fuel tank 10 to a vicinity of a bottom surface of the fuel tank 10. A lower end of the electrode 74 is closed by the lower wall 79. An upper end of the electrode 74 is closed by the upper wall 71. In the liquid level measuring unit 70, a storing space 73 is defined by the electrode 74, the upper wall 71, and the lower wall 79. An inner surface of the electrode 74 constitutes a part of a wall surface that defines the storing space 73. The electrode 76 is housed in the storing space 73. The electrode 76 has a columnar shape. The electrode 74 and the electrode 76 oppose each other across a gap. The electrode 76 is connected to an external power supply via the conducting wire 56 and the control device 80.

The electrode 74 comprises a plurality of through holes 78 which is positioned in a vicinity of the lower end of the electrode 74 and above the lower wall 79. The plurality of through holes 78 penetrates the electrode 74. The through holes 78 communicate the storing space 73 and a tank space 4 outside of the electrode 74 with each other. Moreover, in the present description, a space which is outside of the respective storing spaces 73 and the like and which is outside of the reserve cup 20 among the a space in the fuel tank 10 will be referred to as the tank space 4.

A lower end surface of the lower wall 79 abuts the bottom surface of the fuel tank 10. The pair of electrodes 74 and 76 is supported in the fuel tank 10 by the lower wall 79. In addition, the pair of electrodes 74 and 76 is positioned with respect to the bottom surface of the fuel tank 10 by the lower wall 79. The upper wall 71 comprises a communication opening 72 that communicates the storing space 73 and the connecting pipe 52 with each other. The fuel overflowed from the storing space 63 passes through the connecting pipe 52 and the communication opening 72 and is accepted by the storing space 73. The storing space 73 is communicated with the tank space 4 via the through holes 78. Therefore, a liquid level of the fuel within the storing space 73 is consistent with a liquid level of the fuel within the tank space 4. Moreover, although not illustrated, a communication opening that communicates the storing space 73 and the tank space 4 with each other is formed in the upper wall 71.

The control device 80 respectively supplies a signal (for example, AC voltage) of a frequency determined in advance (for example, 10 Hz to 3 MHz) to the electrodes 66 and 76. Moreover, the control device 80 supplies the same signal or different signals to the electrodes 66 and 76. The control device 80 measures a liquid level of the fuel in the fuel tank 10 using the pair of electrodes 64 and 66 and the pair of electrodes 74 and 76.

Specifically, first, the control device 80 measures a capacitance of the pair of electrodes 64 and 66. When the fuel pump 30 is operating, fuel is discharged from the vapor jet 38. Therefore, the storing space 63 is filled with the fuel. In other words, a space between the pair of electrodes 64 and 66 is filled with fuel. Therefore, while the capacitance of the pair of electrodes 64 and 66 varies in correlation with a conductivity of the fuel between the pair of electrodes 64 and 66, the capacitance of the pair of electrodes 64 and 66 does not vary according to a variation in the liquid level in the fuel tank 10. The control device 80 is mounted with a circuit for converting the measured capacitance of the pair of electrodes 64 and 66 into a conductivity of the fuel.

Next, the control device 80 measures a capacitance of the pair of electrodes 74 and 76. The liquid level of the fuel in the storing space 73 is consistent with the liquid level of the fuel within the tank space 4. Since the conductivity of fuel differs from that of a gas in the fuel tank 10, the capacitance of the pair of electrodes 74 and 76 varies in correlation with the liquid level of the fuel in the storing space 73 or, in other words, the liquid level of the fuel between the pair of electrodes 74 and 76. In addition, the capacitance of the pair of electrodes 74 and 76 varies in correlation with the conductivity of the fuel. The control device 80 is mounted with a circuit for converting the measured capacitance of the pair of electrodes 74 and 76 and the already measured conductivity of the fuel into a liquid level of the fuel. Moreover, the control device 80 outputs the specified liquid level of the fuel to a display device of the automobile.

Fuel which is agitated by the fuel pump 30 and which is discharged from the vapor jet 38 is introduced into the storing space 73. Therefore, the fuel within the storing space 73 is homogenized by the fuel pump 30. According to this configuration, the conductivity of the fuel around the pair of electrodes 74 and 76 can be prevented from being inhomogeneously distributed. As a result, a liquid level can be appropriately measured using the capacitance of the pair of electrodes 74 and 76. In a similar manner, since the fuel within the storing space 63 is homogenized, the conductivity of the fuel that flows into the storing space 73 can be appropriately measured using the capacitance of the pair of electrodes 64 and 66.

There may be cases where the fuel supplied to the fuel tank 10 is a blended fuel containing gasoline and ethanol. When a ratio of gasoline and ethanol in the blended fuel varies, a conductivity of the blended fuel also varies. In some cases where blended fuel remains in the fuel tank 10, blended fuel with a different ratio of gasoline and ethanol is supplied to the fuel tank 10. In such a case, blended fuels with different conductivities inhomogeneously exist in the fuel tank 10 immediately after the blended fuel is supplied. According to the liquid level measuring device 2 described above, a liquid level can be appropriately measured even if blended fuels with different conductivities inhomogeneously exist in the fuel tank 10.

In addition, in the configuration described above, the electrodes 64 and 74 constitute a part of a wall surface defining the storing spaces 63 and 73 which store the fuel that is a measurement target. According to this configuration, entire wall surfaces for defining the storing spaces 63 and 73 need not be individually provided.

In addition, the storing space 63 is disposed between the discharge pipe 82 and the storing space 73. In order to measure a liquid level using the pair of electrodes 74 and 76, the storing space 73 and the tank space 4 should be communicated with each other in order to cause the liquid level within the storing space 73 to vary in accordance with the liquid level within the tank space 4. On the other hand, in order to measure the conductivity of fuel using the pair of electrodes 64 and 66, the liquid level within the storing space 63 should be prevented from varying. When communicating the discharge pipe 82, the storing space 63, and the storing space 73 with one another, the storing space 63 should be disposed below the storing space 73 in a configuration where the storing space 63 is disposed downstream of the storing space 73. On the other hand, when the storing space 63 is disposed between the discharge pipe. 82 and the storing space 73 as in the case of the liquid level measuring device 2, the storing space 63 can be disposed relatively freely.

In the respective embodiments below, since configurations other than the respective measuring units 60 and 70 are similar to that of the first embodiment, illustrations and descriptions thereof will be omitted.

(Second Embodiment)

Figure 2:
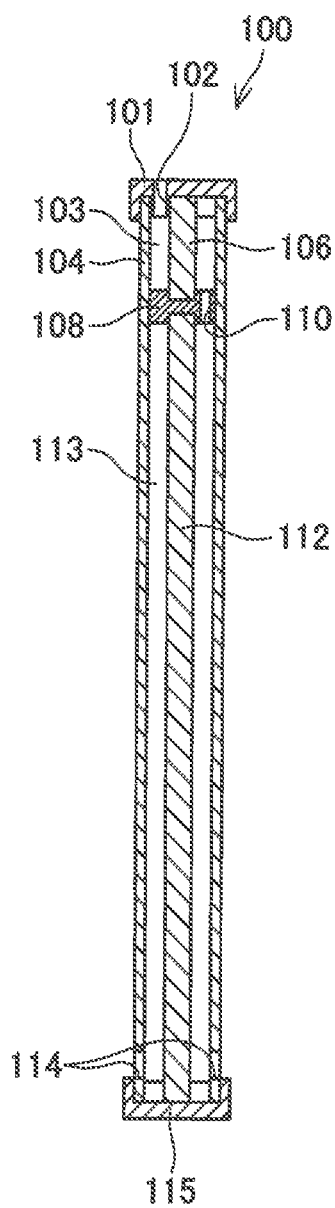
FIG. 2 shows a configuration of a measuring unit of a second embodiment.

As shown in FIG. 2, the liquid level measuring device 2 includes a measuring unit 100. The measuring unit 100 comprises three electrodes 104, 106, and 112, an upper wall 101, a partition 108, and a lower wall 115.

The electrode 104 has a cylindrical shape. The electrode 104 is grounded. The electrode 104 extends from a vicinity of the bottom to a vicinity of the upper end of the fuel tank 10. A lower end of the electrode 104 is closed by the lower wall 115. An upper end of the electrode 104 is closed by the upper wall 101. The electrode 104 is supported by the upper wall 101 and the lower wall 115 by being fitted into grooves that are respectively formed on the upper wall 101 and the lower wall 115. In the measuring unit 100, a space is defined by the electrode 104, the upper wall 101, and the lower wall 115. The space defined by the electrode 104, the upper wall 101, and the lower wall 115 is divided by the partition 108 into two storing spaces 103 and 113. The storing space 103 is defined by the electrode 104, the upper wall 101, and the partition 108. An inner surface of the electrode 104 constitutes a part of a wall surface that defines the storing space 103. The storing space 113 is defined by the electrode 104, the lower wall 115, and the partition 108. An inner surface of the electrode 104 constitutes a part of a wall surface that defines the storing space 113.

The storing space 103 is positioned above the partition 108. The electrode 106 is housed in the storing space 103. The electrode 106 has a columnar shape. The electrode 106 is supported by the upper wall 101 and the partition 108 by being fitted into depressions that are respectively formed on the upper wall 101 and the partition 108. Accordingly, a positional relationship between the electrode 104 and the electrode 106 is maintained. The electrode 104 and the electrode 106 oppose each other across a gap. The electrode 106 is connected to an external power supply. The upper wall 101 comprises a communication opening 102 that communicates the discharge pipe 82 and the storing space 103 with each other. The fuel discharged from the vapor jet 38 passes through the discharge pipe 82 and the communication opening 102 and is accepted by the storing space 103.

The storing space 113 is positioned below the partition 108. The electrode 112 is housed in the storing space 113. The electrode 112 has a columnar shape. The electrode 112 is supported by the lower wall 115 and the partition 108 by being fitted into depressions that are respectively formed on the lower wall 115 and the partition 108. Accordingly, a positional relationship between the electrode 104 and the electrode 112 is maintained. The electrode 104 and the electrode 112 oppose each other across a gap. The electrode 112 is connected to an external power supply. The partition 108 comprises a communication opening 110 that communicates the storing space 103 and the storing space 113 with each other. Fuel in the storing space 103 flows into the storing space 113 via the communication opening 110. A lower end surface of the lower wall 115 abuts the bottom surface of the fuel tank 10. A plurality of through holes 114 that penetrates a peripheral wall of the electrode 104 is formed in a vicinity of the lower end of the electrode 104 and above the lower wall 115. The storing space 113 is communicated with the tank space 4 via the through holes 114. Therefore, a liquid level of the fuel within the storing space 113 is consistent with a liquid level of the fuel in the tank space 4.

In the present embodiment, a conductivity of fuel is measured using a capacitance of the pair of electrodes 104 and 106 and a liquid level is measured using a capacitance of the pair of electrodes 104 and 112. According to this configuration, a liquid level can be appropriately measured using the capacitance of the pair of electrodes 104 and 112 in a similar manner to the first embodiment.

In addition, the present embodiment is provided with the electrode 104 that is shared by the pair of electrodes 104 and 106 for measuring a conductivity of the fuel and the pair of electrodes 104 and 112 for measuring a liquid level. Therefore, the number of electrodes can be reduced and the liquid level measuring device can be downsized.

(Third Embodiment)

Figure 3:
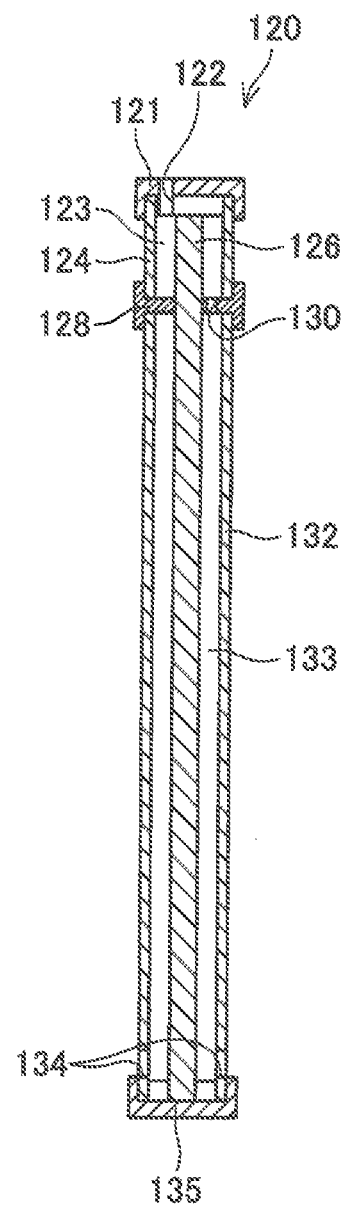
FIG. 3 shows a configuration of a measuring unit of a third embodiment.

Differences from the second embodiment will be described. In the second embodiment, the electrode 104 is provided which is shared by the pair of electrodes 104 and 106 for measuring a conductivity of fuel and the pair of electrodes 104 and 112 for measuring a liquid level. On the other hand, as shown in FIG. 3, the present embodiment is provided with an electrode 126 that is shared by a pair of electrodes 124 and 126 for measuring a conductivity of fuel and a pair of electrodes 132 and 126 for measuring a liquid level. Moreover, an upper wall 121 and a lower wall 135 are respectively configured in a similar manner to the upper wall 101 and the lower wall 115.

The electrode 124 has a cylindrical shape. The electrode 124 is grounded. The electrode 124 extends from a vicinity of the upper end of the fuel tank 10 to a partition 128. A lower end of the electrode 124 is closed by the partition 128. An upper end of the electrode 124 is closed, by the upper wall 121. In a measuring unit 120, a storing space 123 is defined by the electrode 124, the upper wall 121, and the partition 128. An inner surface of the electrode 124 constitutes a part of a wall surface that defines the storing space 123.

A part of an upper side of the electrode 126 is housed in the storing space 123. The electrode 126 has a columnar shape. The electrode 124 and the electrode 126 oppose each other across a gap. The electrode 126 is connected to an external power supply. The electrode 126 extends from the upper wall 121, penetrates the partition 128, and reaches the lower wall 135.

The electrode 132 is disposed below the partition 128. The electrode 132 has a cylindrical shape and is grounded. The electrode 132 extends from the partition 128 to the lower wall 135. A lower end of the electrode 132 is closed by the lower wall 135. An upper end of the electrode 132 is closed by the partition 128. In the measuring unit 120, a storing space 133 is defined by the electrode 132, the lower wall 135, and the partition 128. An inner surface of the electrode 132 constitutes a part of a wall surface that defines the storing space 133. The electrode 132 and the electrode 126 oppose each other across a gap. The storing space 133 is communicated with the storing space 123 via a communication opening 130.

Fuel discharged from the vapor jet 38 passes through the discharge pipe 82 and a communication opening 122 of the upper wall 121 and is accepted by the storing space 123. The fuel within the storing space 123 is accepted by the storing space 133 via the communication opening 130. The storing space 133 is communicated with the tank space 4 via through holes 134 of the electrode 132. Therefore, a liquid level of the fuel within the storing space 133 is consistent with the liquid, level of the fuel in the tank space 4.

According to this configuration, a liquid level can be appropriately measured using the capacitance of the pair of electrodes 126 and 132 in a similar manner to the first embodiment. In addition, the present embodiment is provided with the electrode 126 that is shared by the pair of electrodes 124 and 126 for measuring a conductivity of the fuel and the pair of electrodes 126 and 132 for measuring a liquid level. Therefore, the number of electrodes can be reduced and the liquid level measuring device can be downsized.

(Fourth Embodiment)

Figure 4:
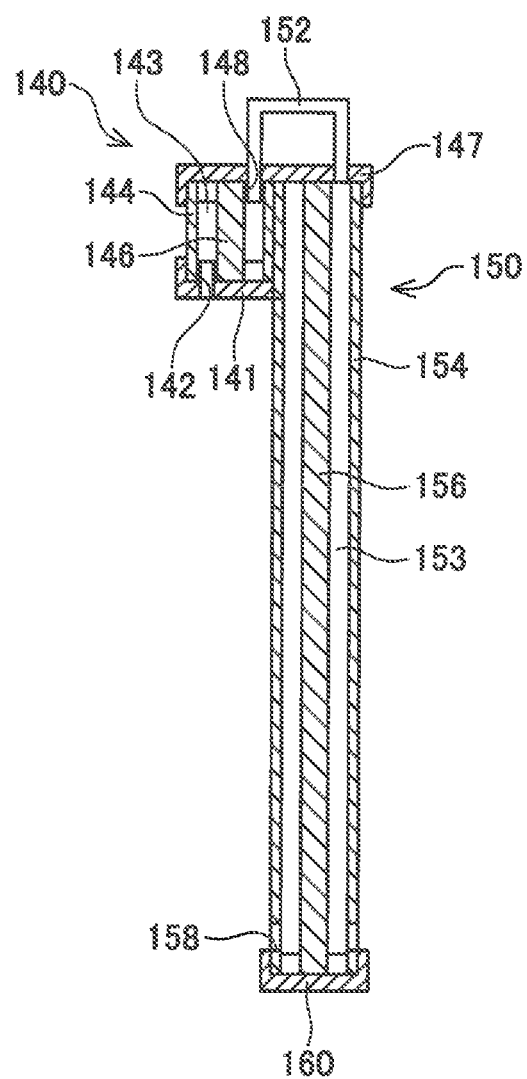
FIG. 4 shows a configuration of a liquid level measuring unit and a conductivity measuring unit of a fourth embodiment.

As shown in FIG. 4, in the present embodiment, a conductivity measuring unit 140 and a liquid level measuring unit 150 are adjacent to each other. The conductivity measuring unit 140 comprises a pair of electrodes 144 and 146 and a lower wall 141 in a similar manner to the pair of electrodes 64 and 66 and the lower wall 61 of the conductivity measuring unit 60. The liquid level measuring unit 150 comprises a pair of electrodes 154 and 156 and a lower wall 160 in a similar manner to the pair of electrodes 74 and 76 and the lower wall 79 of the liquid level measuring unit 70. An outer surface of the electrode 154 and an outer surface of the electrode 144 are in contact with each other.

The conductivity measuring unit 140 and the liquid level measuring unit 150 comprise a shared upper wall 147. The upper wall 147 closes an upper end of the electrode 144 and closes an upper end of the electrode 154. In the conductivity measuring unit 140, a storing space 143 is defined by the pair of electrodes 144 and 146, the lower wall 141, and the upper wall 147. In the liquid level measuring unit 150, a storing space 153 is defined by the pair of electrodes 154 and 156, the lower wall 160, and the upper wall 147.

The fuel discharged from the vapor jet 38 passes through the discharge pipe 82 and a communication opening 142 and is accepted by the storing space 143. The fuel within the storing space 143 is accepted by the storing space 153 via a communication opening 148 and a connecting pipe 152. The fuel within the storing space 153 is discharged to the tank space 4 via a communication opening 158.

Also according to this embodiment, a liquid level can be appropriately measured in a similar manner to the first embodiment.

(Fifth Embodiment)

Figure 5:
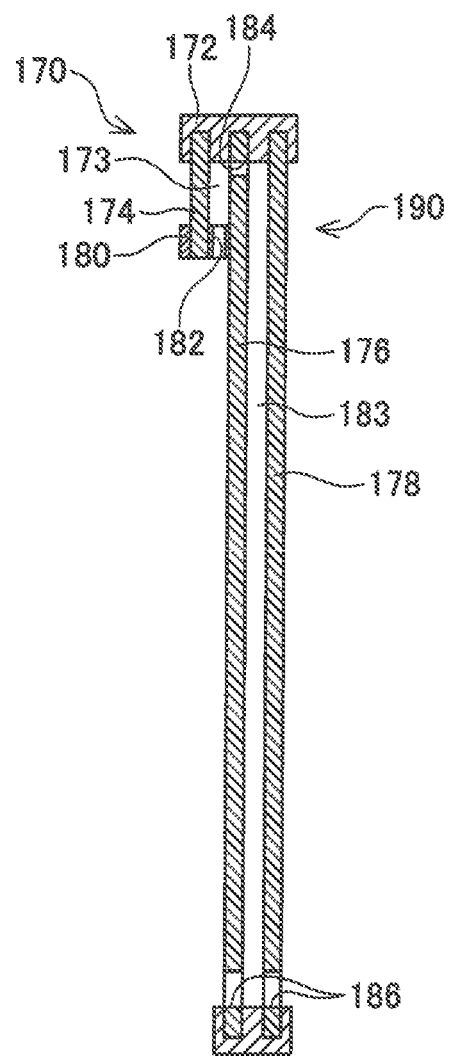
FIG. 5 shows a configuration of a liquid level measuring unit and a conductivity measuring unit of a fifth embodiment.

As shown in FIG. 5, a pair of electrodes 174 and 176 of a conductivity measuring unit 170 and a pair of electrodes 176 and 178 of a liquid level measuring unit 190 respectively have flat plate shapes. The pair of electrodes 174 and 176 and the pair of electrodes 176 and 178 comprise the shared electrode 176. The electrode 174 opposes one of the surfaces of the electrode 176 across a gap. The electrode 178 opposes another surface of the electrode 176 across a gap. Moreover, the electrodes 174 and 178 are respectively connected to an external power supply and the electrode 176 is grounded.

In the conductivity measuring unit 170, a storing space 173 is defined by opposing surfaces of the pair of electrodes 174 and 176, an upper surface of a lower wall 180, a lower surface of an upper wall 172, and opposing surfaces of side walls (not illustrated). The side walls block an opening portion that is formed by the pair of electrodes 174 and 176, the lower wall 180, and the upper wall 172. In the liquid level measuring unit 190, a storing space 183 is defined by opposing surfaces of the pair of electrodes 176 and 178, an upper surface of a lower wall 188, a lower surface of the upper wall 172, and opposing surfaces of side walls (not illustrated). The side walls close an opening portion that is formed by the pair of electrodes 176 and 178, the lower wall 188, and the upper wall 172. The storing space 173 and the storing space 183 are separated from each other by the electrode 176 and are communicated with each other via a communication opening 184 formed in a vicinity of an upper end of the electrode 176.

The fuel discharged from the vapor jet 38 passes through the discharge pipe 82 and a communication opening 182 and is accepted by the storing space 173. The fuel within the storing space 183 passes through the communication opening 184 and is accepted by the storing space 183. The fuel within the storing space 183 passes through communication openings 186 respectively formed in the electrodes 176 and 178 and is discharged into the fuel tank 10 outside of the electrodes 176 and 178.

Also according to this embodiment, a liquid level can be appropriately measured in a similar manner to the first embodiment. In addition, by providing the electrodes 174 to 178 with flat plate shapes, the conductivity measuring unit 170 and the liquid level measuring unit 190 can be downsized.

(Sixth Embodiment)

Figure 6:
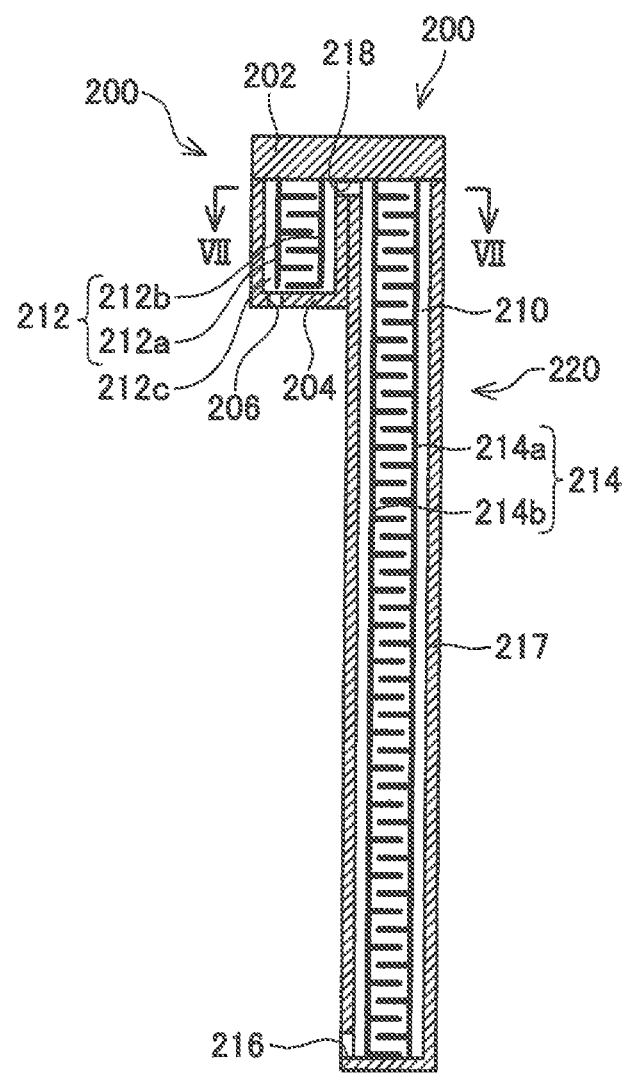
FIG. 6 shows a configuration of a liquid level measuring unit and a conductivity measuring unit of a sixth embodiment.
Figure 7:
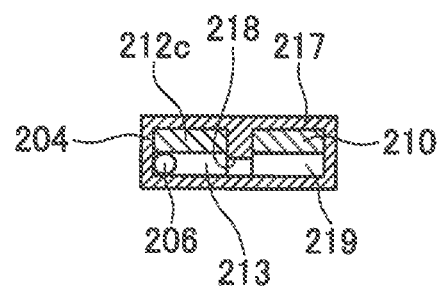
FIG. 7 shows a cross-sectional view of VII-VII cross-section of FIG. 6.

As shown in FIG. 6, a conductivity measuring unit 200 comprises an electrode unit 212 and a case 204. The case 204 has a rectangular parallelepiped shape that is opened at an upper end thereof. An upper end of the case 204 is blocked by a lid 202. The electrode unit 212 is housed in the case 204. The electrode unit 212 includes a substrate 212c and a pair of electrodes 212a and 212b disposed on the substrate 212c. For the pair of electrodes 212a and 212b, a pair of electrodes in which comb-shaped electrodes 212a and 212b oppose each other is formed on the substrate 212c. As shown in FIG. 7, the substrate 212c is bonded to an inner surface of the case 204. In the conductivity measuring unit 200, a storing space 213 is defined by the inner surface of the case 204, one of the surfaces of the substrate 212c, and a lower surface of the lid 202. As shown in FIG. 6, the storing space 213 is communicated with the discharge pipe 82 via a communication opening 206 formed on a bottom wall of the case 204.

A liquid level measuring unit 220 comprises an electrode unit 214 and a case 217. The case 217 has a rectangular parallelepiped shape that is opened at an upper end thereof. The case 217 is integrally formed with the case 204. An upper end of the case 217 is closed by the lid 202. An upper end of the case 217 is closed at a same height as the case 204 and a lower end of the case 217 extends beyond a lower end of the case 204 and abuts the bottom surface of the fuel tank 10. The electrode unit 214 is housed in the case 217. The electrode unit 214 includes a substrate 210 and a pair of electrodes 214a and 214b disposed on the substrate 210. For the pair of electrodes 214a and 214b, a pair of electrodes in which comb-shaped electrodes 214a and 214b oppose each other is formed on the substrate 210. As shown in FIG. 7, the substrate 210 is bonded to an inner surface of the case 217. In the liquid level measuring unit 220, a storing space 219 is defined by the inner surface of the case 217, one of the surfaces of the substrate 210, and a lower end surface of the lid 202. As shown in FIG. 7, the storing space 219 is communicated with the storing space 213 via a communication opening 218 formed on a partition between the case 204 and the case 217. In addition, the storing space 219 is communicated with the inside of the fuel tank 10 outside of the case 217 via a communication opening 216 formed on a side surface in a vicinity of a lower end of the case 217.

The fuel discharged from the vapor jet 38 passes through the discharge pipe 82 and the communication opening 206 and is accepted by the storing space 213. The fuel within the storing space 213 passes through the communication opening 218 and is accepted by the storing space 219. The fuel within the storing space 219 is discharged into the fuel tank 10 outside of the case 217 via the communication opening 216.

Also according to this embodiment, a liquid level can be appropriately measured in a similar manner to the first embodiment. Moreover, in a modification, the case 217 need not necessarily comprise the side wall of the case 217 that is bonded to a surface of the substrate 212c opposite to the surface on which the pair of electrodes 212a and 212b is formed. In a similar manner, the case 217 need not necessarily comprise the side wall of the case 217 that is bonded to a surface of the substrate 210 opposite to the surface on which the pair of electrodes 214a and 214b is formed. In other words, the substrates 210 and 212c may constitute side walls of the case 217.

(Modification of Sixth Embodiment)

Figure 8:
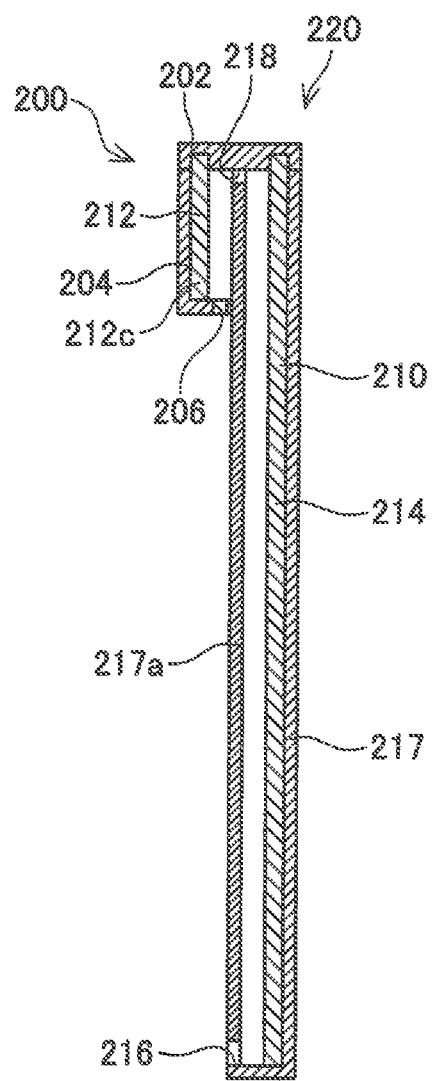
FIG. 8 shows a configuration of a liquid level measuring unit and a conductivity measuring unit of a modification of the sixth embodiment.

As shown in FIG. 8, the electrode units 212 and 214 may be disposed so that, the surface of the substrate 212c on which the pair of electrodes 212a and 212b is disposed and the surface of the substrate 210 on which the pair of electrodes 214a and 214b is disposed oppose each other. Alternatively, one of the substrates 212c and 210 may be disposed as shown in FIG. 7 and the other of the substrates 212c and 210 may be disposed as shown in FIG. 8. Alternatively, the substrates 212c and 210 may be disposed so that the surface of the substrate 212c on which the pair of electrodes 212a and 212b is not disposed and the surface of the substrate 210 on which the pair of electrodes 214a and 214b is not disposed oppose each other across a partition 217a between the case 204 and the case 217.

(Modification of Fifth and Sixth Embodiments)

Figure 9:
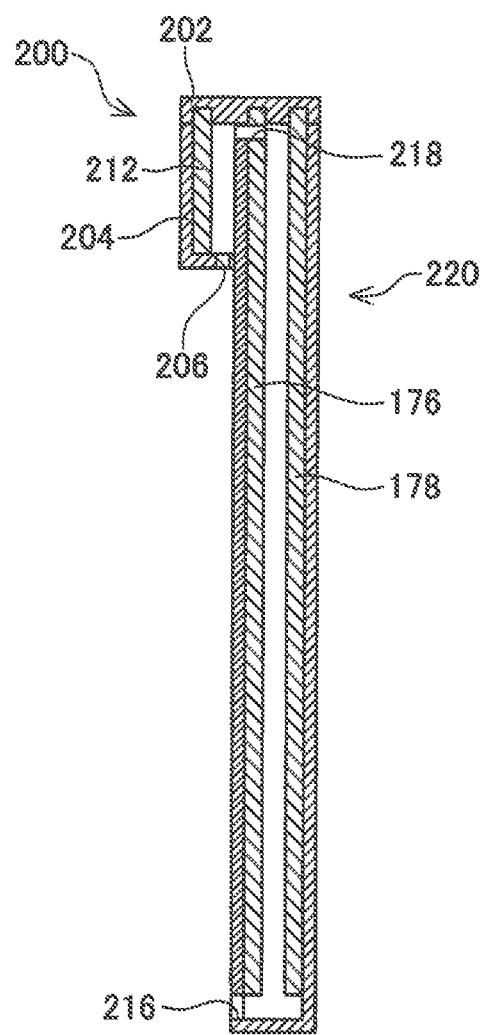
FIG. 9 shows a configuration of a liquid level measuring unit and a conductivity measuring unit of a modification of the fifth embodiment and the sixth embodiment.

In the fifth embodiment, each of the electrodes 174 to 178 has a flat plate shape. In the sixth embodiment, each of the electrodes 212a, 212b, 214a, and 214b has a comb shape. However, as shown in FIG. 9, the conductivity measuring unit 200 may comprise the electrode unit 212 having the comb-shaped electrodes 212a and 212b. The liquid level measuring unit 220 may comprise the flat plate electrodes 176 and 178. Alternatively, the conductivity measuring unit 200 may comprise the flat plate electrodes 174 and 176. The liquid level measuring unit 220 may comprise the electrode unit 214 having the comb-shaped electrodes 214a and 214b.

(Seventh Embodiment)

Figure 10:
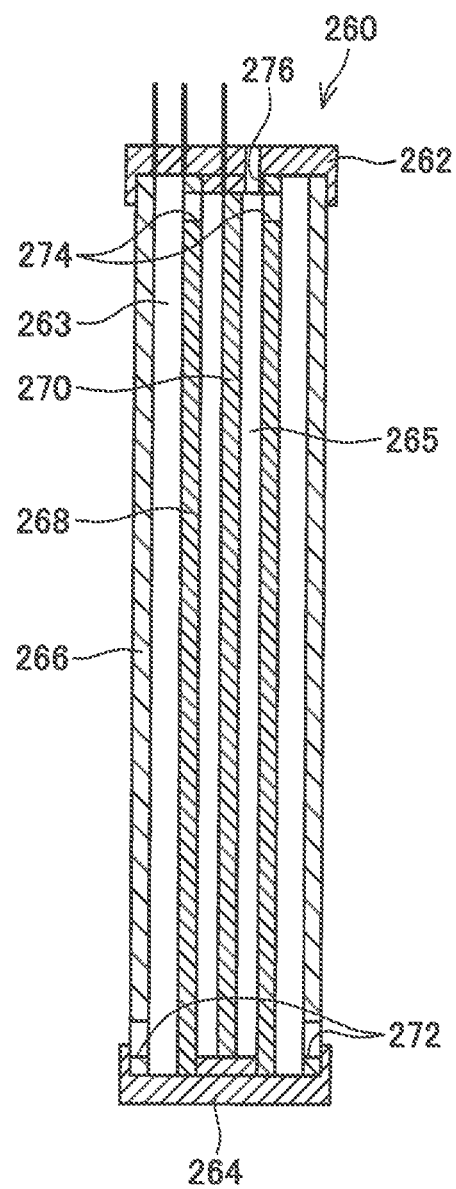
FIG. 10 shows a configuration of a measuring unit of a seventh embodiment.

As shown in FIG. 10, a measuring unit 260 comprises three electrodes 266, 268, and 270, an upper wall 262, and a lower wall 264. The electrode 266 has a cylindrical shape. The electrode 266 extends from a vicinity of the upper end to the bottom surface of the fuel tank 10. The electrode 266 is connected to an external power supply. An upper end of the electrode 266 is closed by the upper wall 262 and a lower end of the electrode 266 is closed by the lower wall 264. A storing space 263 is defined by an inner surface of the electrode 266 and inner surfaces of the upper and lower walls 262 and 264.

A pair of electrodes 268 and 270 is housed in the storing space 263. The electrode 268 has a cylindrical shape with a smaller diameter than the electrode 266. The electrode 268 extends from a vicinity of the upper end to the bottom surface of the fuel tank 10. The electrode 268 is grounded. An upper end of the electrode 268 is closed by the upper wall 262 and a lower end of the electrode 268 is closed by the lower wall 264. A storing space 265 is defined by an inner surface of the electrode 268 and the inner surfaces of the upper and lower walls 262 and 264. In other words, the storing space 265 is housed in the storing space 263.

The electrode 270 is housed in the storing space 265. The electrode 270 has a columnar shape. The electrode 270 extends from a vicinity of the upper end to the bottom surface of the fuel tank 10. The electrode 270 is connected to an external power supply. Moreover, the three electrodes 266, 268, and 270 are positioned by being fitted to the upper and lower walls 262 and 264.

A communication opening 276 that communicates the discharge pipe 82 and the storing space 265 with each other is disposed on the upper wall 262. The storing space 265 is communicated with the storing space 263 via a plurality of communication openings 274 formed in a vicinity of an upper end of the electrode 268. The storing space 263 is communicated with the tank space 4 via a plurality of communication openings 272 formed in a vicinity of a lower end of the electrode 266.

The fuel discharged from the vapor jet 38 passes through the discharge pipe 82 and the communication opening 276 and is accepted by the storing space 265. When the storing space 265 is filled with fuel, the fuel flows into the storing space 263 via the communication opening 274. The storing space 263 is communicated with the fuel tank 10 via the communication opening 272 in a vicinity of the lower end of the electrode 266 or, in other words, in a vicinity of the lower end of the fuel tank 10. Therefore, in the measuring unit 260, the storing space 265 is filled with fuel and the storing space 263 stores fuel to a same liquid level as the liquid level in the fuel tank 10 outside of the electrode 266.

That is, a capacitance of the pair of electrodes 268 and 270 is in correlation with the conductivity of fuel but not in correlation with the liquid level of the fuel. On the other hand, a capacitance of the pair of electrodes 266 and 268 is in correlation with both the conductivity and the liquid level of the fuel. The control device 80 measures the liquid level of fuel using the capacitance of the pair of electrodes 266 and 268 and the conductivity of the fuel.

Also according to this embodiment, a liquid level can be appropriately measured in a similar manner to the first embodiment.

In addition, the storing space 265 is positioned within the storing space 263. In this configuration, the storing space 265 exists around the storing space 263. According to this configuration, when measuring conductivity using the pair of electrodes 268 and 270, the capacitance of the pair of electrodes 268 and 270 can be prevented from varying due to outside environment (for example, external radio waves). Furthermore, the storing space 265 is defined by an inner surface of the electrode 268. According to this configuration, the storing space 265 can be readily disposed within the storing space 263.

(Eighth Embodiment)

Differences from the seventh embodiment will be described with reference to FIG. 11. A columnar portion 280 is housed inside the electrode 268. The columnar portion 280 occupies an inside space of the electrode 268 with the exception of an upper portion of the inside space. A storing space 275 is defined by an inner surface of the electrode 268, an upper end surface of the columnar portion 280, and the lower surface of the upper wall 262. The storing space 275 is filled with fuel in a similar manner to the storing space 265.

An electrode 282 with a bottomed cylindrical shape is housed in the storing space 275. A thermistor 284 is housed inside the electrode 282. The control device 80 measures a ratio of gasoline and ethanol in the fuel using a temperature of the fuel as measured by the thermistor 284 and the capacitance of the pair of electrodes 282 and 268.

Also according to this configuration, a similar operational effect as the seventh embodiment can be achieved.

(Modification of Eighth Embodiment)

Figure 11:
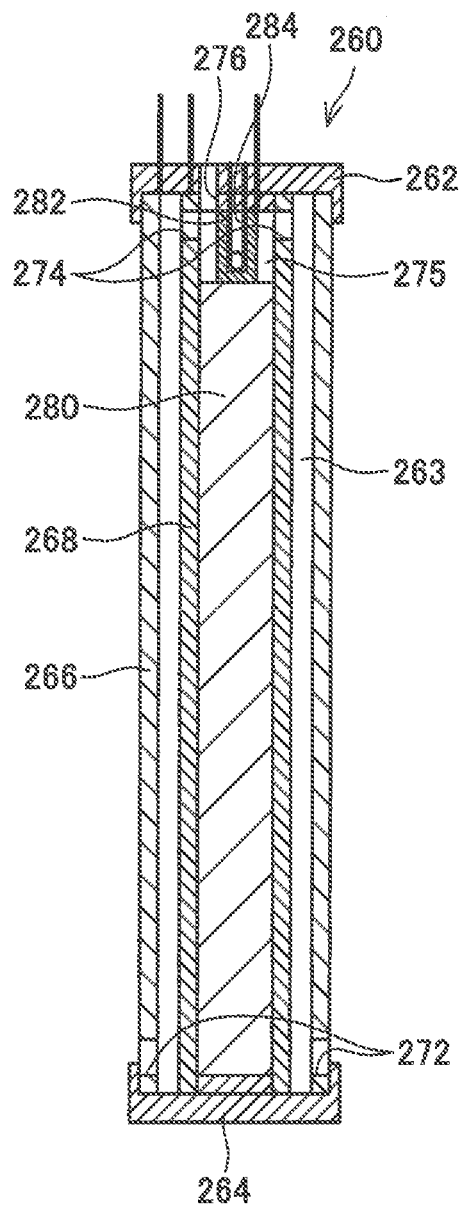
FIG. 11 shows a configuration of a measuring unit of an eighth embodiment.
Figure 12:
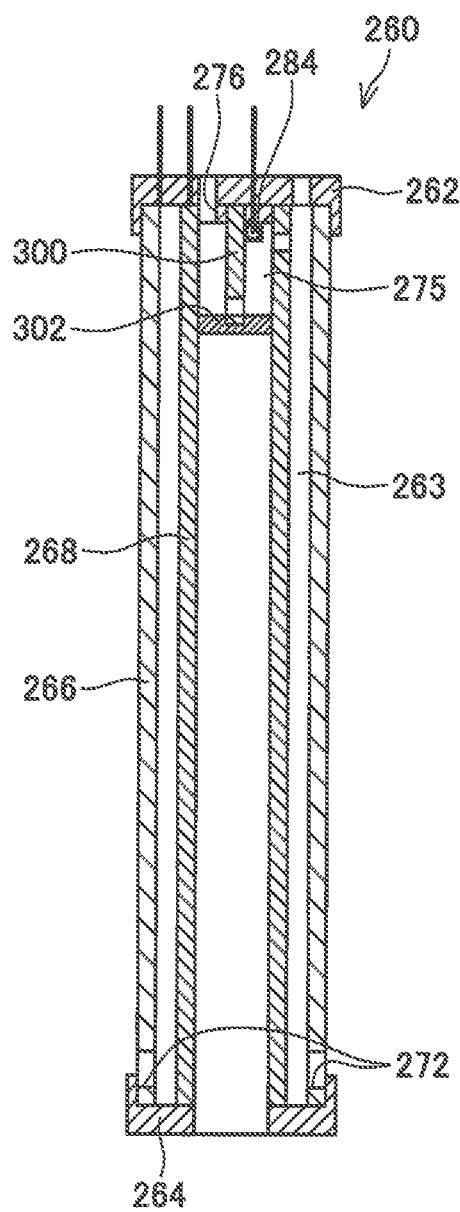
FIG. 12 shows a configuration of a measuring unit of a modification of the eighth embodiment.

As shown in FIG. 12, the measuring unit 260 may include, in place of the columnar portion 280, a bottom wall 302 at a same position as the upper end surface of the columnar portion 280 of FIG. 11. An electrode 300 with a flat plate shape may be provided in place of the electrode 282. The thermistor 284 may be housed in the storing space 275. Moreover, the electrode 300 may be separated from the electrode 268 or may be in contact with the electrode 268 across an insulating member. The electrode 300 may comprise a through hole. The electrode unit 212 may be disposed in place of the electrode 300.

(Ninth Embodiment)

Figure 13:
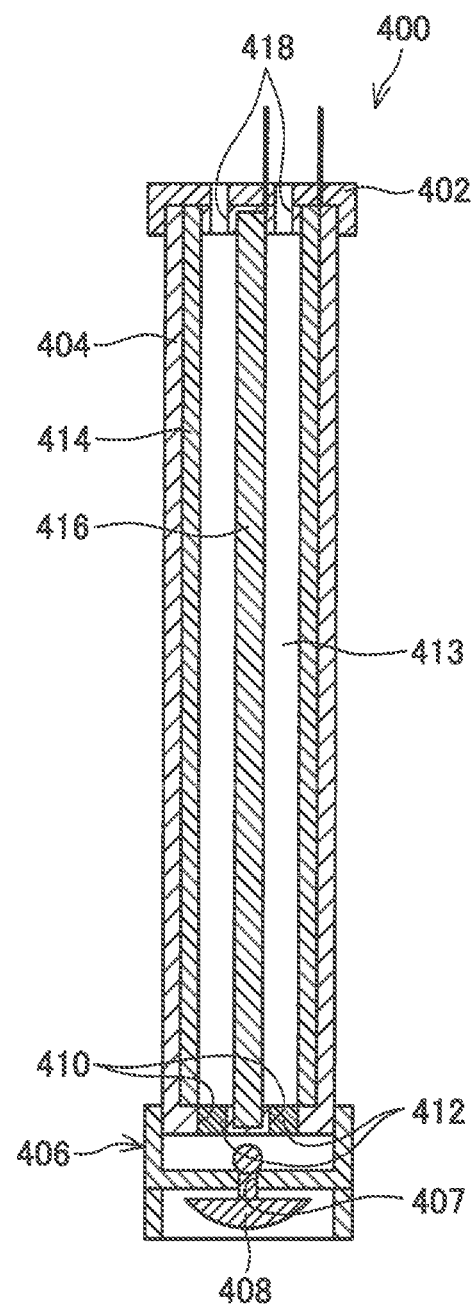
FIG. 13 shows a configuration of a liquid level measuring unit of a ninth embodiment

As shown in FIG. 13, the liquid level measuring device 2 comprises a liquid level measuring unit 400 in place of the liquid level measuring unit 70. Moreover, the liquid level measuring device 2 comprises the conductivity measuring unit 60. The liquid level measuring unit 400 comprises a pair of electrodes 414 and 416 that is similar to the pair of electrodes 74 and 76 of the liquid level measuring unit 70. The electrode 414 is housed in a case 404. An outer surface of the electrode 414 is in contact with an inner surface of the case 404. The outer surface of the electrode 414 may be in contact with the inner surface of the case 404 so that fuel does not enter between the outer surface of the electrode 414 and the inner surface of the case 404. An upper end of the electrode 414 is closed by an upper wall 402 and a lower end of the electrode 414 is closed by the case 404. A storing space 413 is defined by an inner surface of the electrode 414, a lower surface of the upper wall 402, and a bottom surface of the case 404. A plurality of communication openings 418 is formed on the upper wall 402. A plurality of communication openings 410 is formed at the bottom of the case 404. A filter 412 is disposed in the communication openings 410. The filter 412 is fabricated from, for example, a non-woven fabric. A check valve 406 is disposed below the bottom of the case 404. The check valve 406 normally opens a communication opening 407. When fuel flows into the storing space 413 from the fuel tank 10, a valve body 408 of the check valve 406 closes the communication opening 407 to prevent the fuel from flowing into the storing space 413 from the fuel tank 10. According to this configuration, fuel that is not agitated by the fuel pump 30 is prevented from flowing into the storing space 413. When fuel passes through the cheek valve 406 and flows into the storing space 413 from the fuel tank 10, the fuel passes through the filter 412. Accordingly, a foreign substance in the fuel is removed and prevented from being mixed into the storing space 413.

Fuel having passed through the connecting pipe 52 and one communication opening 418 from the conductivity measuring unit 60 is accepted by the storing space 413. Moreover, among the plurality of communication openings 418, at least one of the plurality of communication openings 418 not connected to the connecting pipe 52 communicates the storing space 413 and the tank space 4 with each other. Accordingly, gas is circulated between the storing space 413 and the tank space 4. As a result, air pressure within the storing space 413 and air pressure in the tank space 4 become consistent with each other. The fuel in the storing space 413 passes through the communication opening 410 and the check valve 406 and is discharged into the fuel tank 10. Moreover, the liquid level measuring unit 400 may comprise one of the check valve 406 and the filter 412.

Also according to this configuration, a similar operational effect as the first embodiment can be achieved.

(Modification of Ninth Embodiment)

Figure 14:
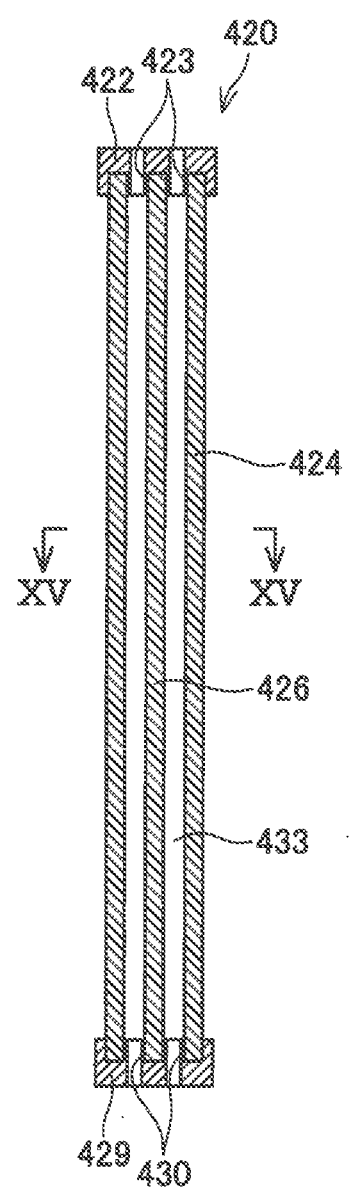
FIG. 14 shows a configuration of a liquid level measuring unit of a modification of the ninth embodiment.
Figure 15:
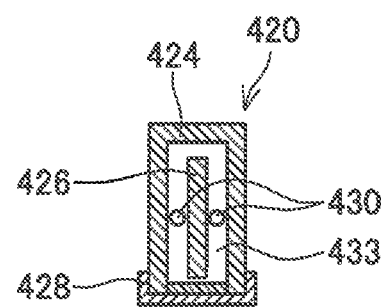
FIG. 15 shows a cross-sectional view of XV-XV cross-section of FIG. 14.

The liquid level measuring device 2 may comprise a liquid level measuring unit 420 in place of the liquid level measuring unit 400. As shown in FIG. 14, the liquid level measuring unit 420 may comprise a pair of electrodes 424 and 426, an upper wall 422, and a lower wall 429. In addition, as shown in FIG. 15, the liquid level measuring unit 420 may comprise a side wall 428. The electrode 424 may have a square cylindrical shape with one side surface opened. The opened side surface of the electrode 424 may be closed by the side wall 428. The side wall 428 may couple the upper wall 422 and the lower wall 429 to each other. A storing space 433 may be defined by the electrode 424, the upper wall 422, the lower wall 429, and the side wall 428.

The storing space 433 may be communicated with the connecting pipe 52 via a communication opening 423 formed on the upper wall 422 and communicated with the inside of the fuel tank 10 outside of the storing space 433 via a communication opening 430 formed on the lower wall 429. The communication opening 430 may be opened to a lower surface of the lower wall 429 abutting the bottom surface of the fuel tank 10. According to this configuration, fuel can be prevented from flowing into the storing space 433 from the tank space 4 via the communication opening 430.

(Tenth Embodiment)

Figure 16:
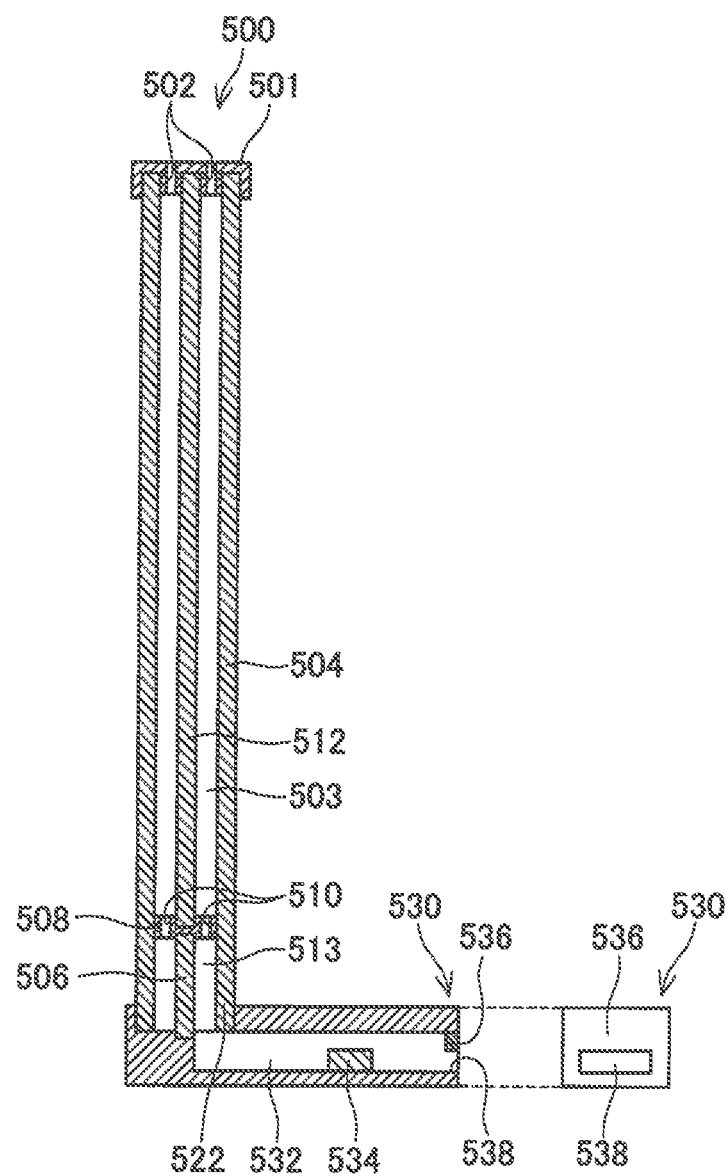
FIG. 16 shows a configuration of a liquid level measuring unit and a conductivity measuring unit of a tenth embodiment.

As shown in FIG. 16, a measuring unit 500 comprises electrodes 504, 506, and 512, an upper wall 501, a partition 508, and a storing case 530. The electrode 504 is configured in a similar manner to the electrode 104. An upper end of the electrode 504 is closed by the upper wall 501 and a lower end of the electrode 504 is closed by the storing case 530. In the measuring unit 500, a space is defined by the electrode 504, the upper wall 501, and the storing case 530. The space defined by the electrode 504, the upper wall 501, and the storing case 530 is divided by the partition 508 into two storing spaces 503 and 513. The storing space 503 is defined by an inner surface of the electrode 504, a lower surface of the upper wall 501, and an upper surface of the partition 508. The storing space 513 is defined by the inner surface of the electrode 504, an upper surface of the storing case 530, and a lower surface of the partition 508.

The electrode 512 is housed in the storing space 503 above the partition 508. The electrode 512 is configured in a similar manner to the electrode 112. The electrode 506 is housed in the storing space 513 positioned below the partition 508. The electrode 506 is configured in a similar manner to the electrode 106. The partition 508 comprises a communication opening 510 that communicates the storing space 503 and the storing space 513 with each other. Fuel in the storing space 503 flows into the storing space 513 via the communication opening 510. The storing case 530 is attached to a lower end of the electrode 504. The storing case 530 defines a storing space 532.

The storing space 532 is communicated with the storing space 513 via a communication portion 522. The storing space 532 extends vertically with respect to the electrode 504. A cross section that is perpendicular to an extending direction of the storing space 532 has a square shape. The storing case 530 has an opening portion 538 that communicates the storing space 532 and the fuel tank 10 with each other. A protrusion 536 is provided at the opening portion 538. Accordingly, the opening portion 538 is formed in an elongated rectangular shape. Moreover, in a modification, the opening portion 538 may have a slit shape or a ring shape. Generally, the opening portion 538 is formed narrow to such a degree that prevents a foreign substance in the fuel from passing therethrough. An embankment 534 is formed at a midway position of the storing space 532. The embankment 534 reduces a flow passage area of the storing space 532.

Fuel discharged from the storing space 513 via the communication portion 522 is stored in the storing space 532. That is, the storing space 532 is filled with fuel agitated by the fuel pump 30. In a case where fuel is supplied to the fuel tank 10 when the fuel pump 30 is stopped, the liquid level of fuel in the tank space 4 rises. As a result, the fuel in the fuel tank 10 passes through the opening portion 538 and flows into the storing space 532. Accordingly, the fuel within the storing space 532 flows into the storing space 513. According to this configuration, liquid flowing from inside the fuel tank 10 toward the storing space 513 can be prevented from directly entering the storing spaces 503 and 513. Consequently, fuel that is not agitated by the fuel pump 30 can be prevented from entering the storing spaces 503 and 513.

In addition, the opening portion 538 has an elongated shape. Therefore, when the fuel in the fuel tank 10 flows into the storing space 532, a foreign substance in the fuel can be prevented from entering the storing space 532. The embankment 534 can prevent a foreign substance in the fuel from going over the embankment 534 and entering the storing space 532. According to this configuration, a foreign substance can be prevented from entering the storing spaces 503 and 513 when fuel flows into the storing spaces 503 and 513 from the storing space 532.

(Modification of Tenth Embodiment)

Figure 17:
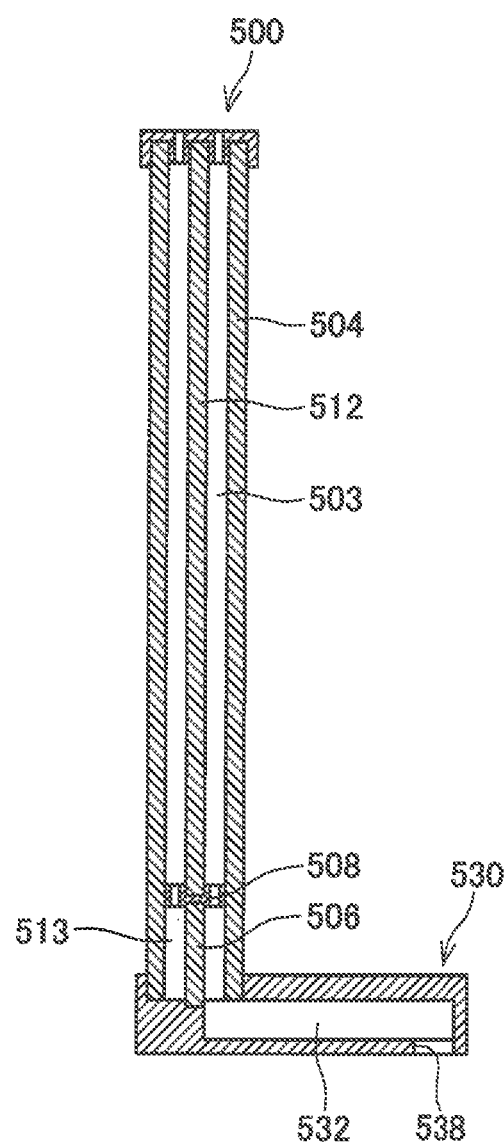
FIG. 17 shows a configuration of a liquid level measuring unit and a conductivity measuring unit of a modification of the tenth embodiment.

As shown in FIG. 17, the opening portion 538 may be formed in a direction opposing the bottom surface of the fuel tank 10 or, in other words, a downward direction. According to this configuration, fuel can be prevented from entering the storing space 532 from the inside of the fuel tank 10.

(Modifications)

(1) In the respective embodiments described above, the pairs of electrodes 74 and 76 and the like may be housed in cases. In this case, the pairs of electrodes 74 and 76 and the like may abut inner surfaces of the cases. In other words, the pairs of electrodes 74 and 76 and the like may be in contact with the inner surfaces of the cases so that fuel does not enter between the electrodes 74 and 76 and the like and the inner surfaces of the cases.

(2) The liquid level measuring device 2 may be mounted to a motorcycle and the like in addition to automobiles. In addition, the liquid level measuring device 2 may measure a liquid level of, for example, cooling water in addition to a liquid level of fuel.

(3) In the respective embodiments described above, the storing spaces 73 and the like accept fuel discharged from the vapor jet 38 of the fuel pump 30. However, for example, the storing spaces 73 and the like may accept fuel discharged from the pressure regulator 42 or accept fuel discharged from a pipe branched from a fuel pipe 94.

(4) In the respective embodiments described above, the liquid level measuring device 2 comprises a pair of electrodes for measuring a conductivity of fuel. However, the liquid level measuring device 2 need not necessarily comprise a pair of electrodes for measuring a conductivity of fuel. For example, in a case where the conductivity of fuel is determined in advance and a variation in the conductivity is small, a liquid level can be appropriately measured without measuring the conductivity of fuel.

(5) An electrode for measuring a liquid level may include a through hole that penetrates the electrode. According to this configuration, by preventing fuel from adhering to the electrode, measurement error can be reduced.

(6) In the pairs of electrodes in the respective embodiments described above, the grounded electrode and the electrode connected to an external power supply may be interchanged by changing a circuit configuration of the control device 80. For example, in the first embodiment, the electrode 64 may be connected to the external power supply and the electrode 66 may be grounded.

(7) The control device 80 according to the respective embodiments described above measures a capacitance of pairs of electrodes. However, the control device 80 may measure both a conductivity and a liquid level of fuel by supplying power to one of the electrodes of a pair of electrodes and measuring a current or the like outputted by the other electrode.

The invention claimed is:

1. A liquid level measuring device for measuring a liquid level of liquid stored in a container, the liquid level measuring device comprising:
   a discharging unit configured to discharge the liquid compressed by a pump, the pump being configured to suck the liquid stored in the container and feed the liquid toward a liquid usage device by pressure;
   a first storing space located in the container and configured to accept the liquid discharged from the discharging unit; and
   an electrode unit disposed in the first storing space and comprising a first pair of electrodes configured to measure the liquid level of the liquid within the first storing space, wherein
   the electrode unit composes at least a part of a wall surface defining the first storing space,
   wherein the liquid level measuring device further comprises
   a second storing space located in the container and configured to accept the liquid discharged from the discharging unit; and
   a second pair of electrodes disposed in the second storing space and configured to measure conductivity of liquid within the second storing space,
   the second storing space is disposed between the discharging unit and the first storing space and communicates with the first storing space.

2. The liquid level measuring device as in claim 1, wherein one electrode of the first pair of electrodes and one electrode of the second pair of electrodes are one common electrode.

3. The liquid level measuring device as in claim 1, wherein the electrode unit comprises a substrate on which the first pair of the electrodes and the second pair of the electrodes are disposed.

4. The liquid level measuring device as in claim 1, wherein the second storing space is located within the first storing space.

5. The liquid level measuring device as in claim 4, wherein the first pair of electrodes comprises:
   a first electrode having a cylindrical shape; and
   a second electrode having a cylindrical shape and disposed inside of the first electrode, and
   the second storing space is defined by an inner surface of the second electrode.

6. The liquid level measuring device as in claim 1, further comprising:
   a temperature detecting unit stored in the second storing space and configured to detect a temperature of the liquid within the second storing space.

7. A liquid level measuring device for measuring a liquid level of liquid stored in a container, the liquid level measuring device comprising:
   a discharging unit configured to discharge the liquid compressed by a pump, the pump being configured to suck the liquid stored in the container and feed the liquid toward a liquid usage device by pressure;
   a first storing space located in the container and configured to accept the liquid discharged from the discharging unit; and
   an electrode unit disposed in the first storing space and comprising a first pair of electrodes configured to measure the liquid level of the liquid within the first storing space, wherein
   the electrode unit composes at least a part of a wall surface defining the first storing space,
   the liquid level measuring device further comprises:
   a wall disposed on a lower side of the electrode unit and comprising a wall portion composing a part of the wall surface defining the first storing space; and
   a check valve disposed outside of the first storing space,
   the wall portion comprises a communicating opening communicating inside and outside of the first storing space, and
   the check valve is configured to allow the liquid to flow from the inside to the outside of the first storing space through the communication opening and restrain the liquid to flow from the outside to the inside of the first storing space through the communication opening.

8. A liquid level measuring device for measuring a liquid level of liquid stored in a container, the liquid level measuring device comprising:
   a discharging unit configured to discharge the liquid compressed by a pump, the pump being configured to suck the liquid stored in the container and feed the liquid toward a liquid usage device by pressure;
   a first storing space located in the container and configured to accept the liquid discharged from the discharging unit; and an electrode unit disposed in the first storing space and comprising a first pair of electrodes configured to measure the liquid level of the liquid within the first storing space, wherein the electrode unit composes at least a part of a wall surface defining the first storing space, the liquid level measuring device further comprises:

a wall disposed on a lower side of the electrode unit and comprising a wall portion composing a part of the wall surface defining the first storing space; and a storing case disposed outside of the first storing space and defining a third storing space storing the liquid flown from the inside to the outside of the first storing space, the wall portion comprises a communicating opening communicating inside and outside of the first storing space, and the storing case comprises an opening portion communicating inside of the third storing space and inside of the container.

9. The liquid level measuring device as in claim 8, wherein a cross-sectional shape of the opening portion is a narrow shape.

10. The liquid level measuring device as in claim 8, wherein the opening portion opens toward a bottom of the container.

11. The liquid level measuring device as in claim 8, wherein the storing case comprises an embankment reducing a flow passage area in which the liquid flows within the third storing space.

* * * * *